United States Patent [19]

Lai

[11] Patent Number: 4,608,065

[45] Date of Patent: Aug. 26, 1986

[54] MOISTURE REMOVAL FOR STACK GAS MONITOR

[75] Inventor: Michael M. Lai, Friendswood, Tex.

[73] Assignee: Champion International Corporation, Stamford, Conn.

[21] Appl. No.: 719,518

[22] Filed: Apr. 3, 1985

[51] Int. Cl.⁴ .............................................. B01D 45/08
[52] U.S. Cl. ...................................... 55/269; 55/270; 55/434; 55/461; 55/466
[58] Field of Search ................. 55/269, 268, 434, 445, 55/461, 270, 466

[56] References Cited

U.S. PATENT DOCUMENTS

| | | | |
|---|---|---|---|
| 565,263 | 8/1896 | Drewsen | 55/355 |
| 2,197,243 | 4/1940 | Moran | 165/177 |
| 3,395,511 | 8/1968 | Akerman | 55/268 |

FOREIGN PATENT DOCUMENTS 30882  8/1980  Japan ....................................... 55/269

Primary Examiner—Bernard Nozick
Attorney, Agent, or Firm—Evelyn M. Sommer; William W. Jones

[57] ABSTRACT

Moisture is removed from stack gas prior to measuring concentrations of gaseous constituents in the stack gas. A sample of the stack gas is passed through a cooling zone wherein the gas is cooled to a temperature in the range of about 40°–45° F., after which the cooled gas is passed through a condenser. The gas rises through the condenser wherein water condenses out of the gas and falls by gravity into a U-shaped trap. A drain passage communicates with the downstream side of the trap whereby condensed water can be drained periodically out of the trap to control the amount of water in the trap. The dried gas passes out of the condenser into one or more gas constituent monitoring stations.

4 Claims, 2 Drawing Figures

U.S. Patent  Aug. 26, 1986  4,608,065
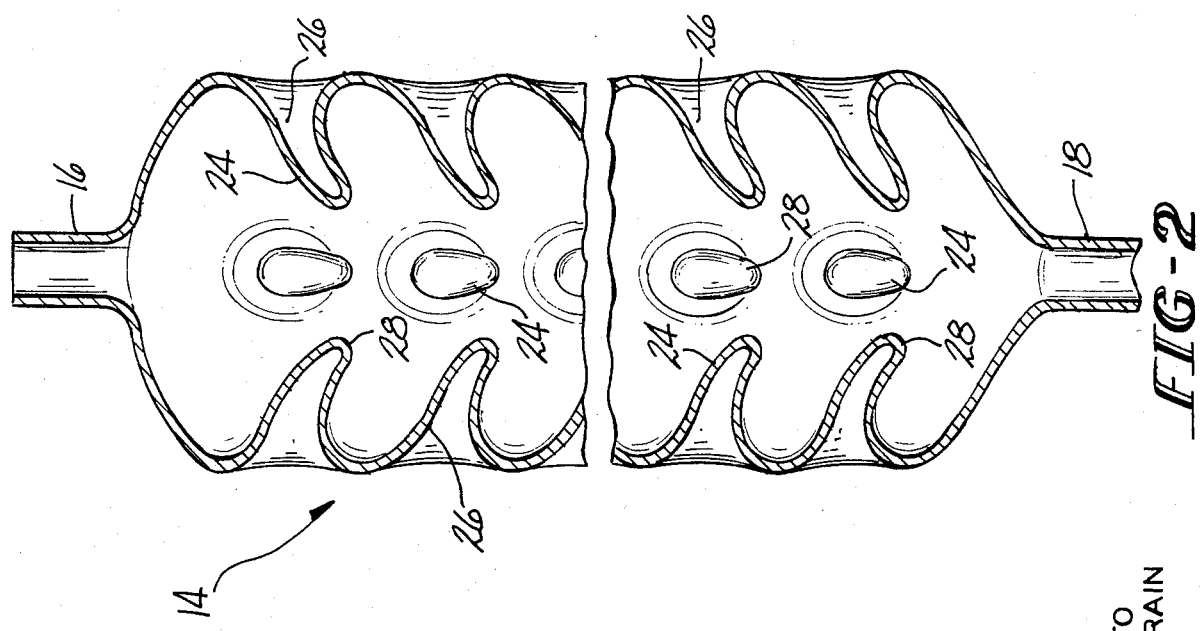
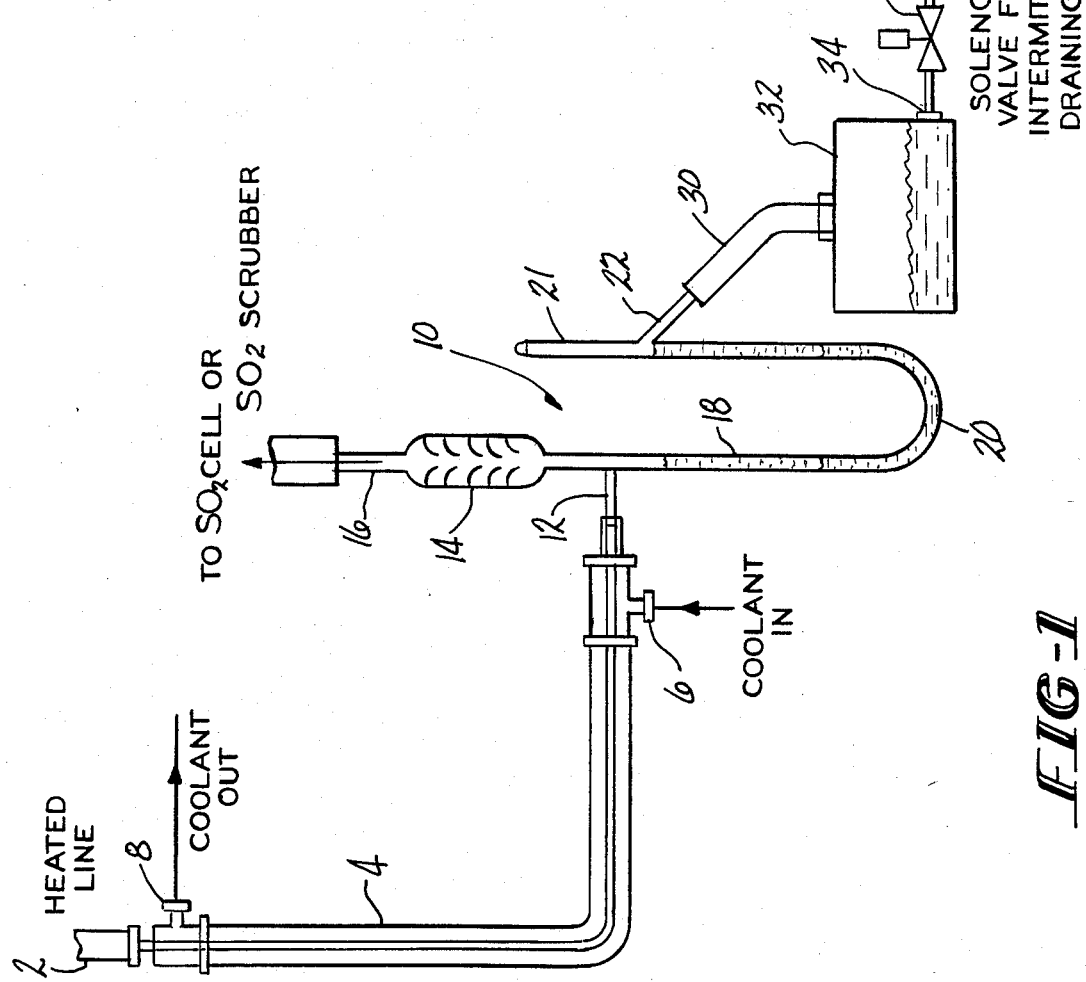

MOISTURE REMOVAL FOR STACK GAS MONITOR

This invention relates to the removal of water from gas to allow for more accurate monitoring of gaseous chemical constituents of the gas. More particularly, this invention relates to a method and apparatus for drying stack gas by condensing water out of the stack gas prior to monitoring the gas for the amount of the constituent being measured.

Monitoring systems are used on industrial smoke stacks to constantly monitor the amounts of various gaseous constituents, such as: $SO_2$; $O_2$; total reduced sulfur (TRS); and the like. In certain of these monitoring systems, the stack gas must be dry in order that the particular constituent can be accurately measured. Presently existing systems for monitoring the amount of $SO_2$ and TRS in stack gases in paper mill installations utilize permeation tube moisture removal devices for drying the stack gas samples before they are passed through the analyzers. In the TRS monitor, the gas is also passed through an $SO_2$ scrubber prior to reaching the analyzer. The permeation tube moisture removal devices comprise a selectively permeable plastic tube through which cooled gases are passed. The wall of the tube is permeable to moisture but not to other gases in the stack gas, whereby the moisture will migrate out of the stack gases through the wall of the permeation tube. These tubes are very sensitive devices and the pores in the plastic can overload with water or can plug with organic chemicals found in the stack gases. Also, these tubes can expand when overloaded with water. When the tube expands, it can come loose from its holder whereupon the system becomes inoperative.

This invention relates to a moisture removal device which can be used to remove moisture from stack gases, or from any other gases which are to be monitored or analyzed in a dry state. The device includes a preferably one-piece glass member which has an inlet passage to admit the cooled gas into the member, a condenser portion on one side of the inlet into which the incoming cooled gas passes, and a drain passage on another side of the inlet into which condensed moisture can fall from the condenser. A U-shaped trap is provided at the bottom of the drain and a water outlet is provided downstream of the trap. A dry gas outlet is also provided downstream of the condenser. Water is periodically removed from a reservoir which receives the condensate from the device.

Moisture is removed from stack gas prior to measuring concentrations of gaseous constituents in the stack gas. A sample of the stack gas is passed through a cooling zone wherein the gas is cooled to a temperature in the range of about 40°-45° F., after which the cooled gas is passed through a condenser. The gas rises through the condenser wherein water condenses out of the gas and falls by gravity into a U-shaped trap. A drain passage communicates with the downstream side of the trap whereby condensed water can be drained periodically out of the trap to control the amount of water in the trap. The dried gas passes out of the condenser into one or more gas constituent monitoring stations.

It is, therefore, an object of this invention to provide a system of removing water from gases which are required to be dry for chemical analysis.

It is a further object of this invention to provide a system of the character described wherein the gases are cooled and then passed through a condenser wherein water condenses out of the cooled gases.

It is yet another object of this invention to provide a system of the character described wherein water condensed out of the gases falls into a drain in continuous fashion.

It is an additional object of this invention to provide a system of the character described which includes a trap in the condenser drain to prevent the gases from escaping from the condenser through the condenser drain.

These and other objects and advantages of the invention will become more readily apparent from the following detailed description of a preferred embodiment of the invention when taken in conjunction with the accompanying drawings, in which:

FIG. 1 is a relatively schematic view of the moisture removal system of ths invention; and FIG. 2 is a fragmented sectional view of the condenser part of the sytem of FIG. 1.

Referring now to FIG. 1, the system includes a tap line 2 which brings a sampling of the gas to be tested into the system from the source of the gas. In this case, when stack gas is being treated, the tap line 2 comes from a smoke stack and funnels a continuous supply of sample gas from the stack into the system. The hot gas flows through a coolant jacket 4 having an inlet fitting 6 through which a coolant is introduced into the jacket 4. The jacket 4 also has an outlet fitting 8 through which coolant is withdrawn from the jacket 4. Downstream of the coolant jacket 4 is a condenser assembly denoted generally by the numeral 10 which is preferably made from glass and which includes an inlet passage 12, a condensing chamber 14, a dry gas outlet 16, a condensate drain 18, a condensate trap 20, and a condensate outlet 22. The inlet passage 12 telescopes into the gas passage at the downstream end of the coolant jacket 4 so that cooled stack gas at a temperature in the range of 40°-45° F. passes into the condenser assembly via the inlet. On startup, the trap 20 is pre-filled with water so that the entering gas cannot pass out of the assembly 10 through the drain 18. The cooled gas thus passes upward through the condensing chamber 14 where the water vapor contents of the gas condenses out of the gas onto the interior of the condensing chamber 14. Referring to FIG. 2, the nature of the condensing chamber 14 is more clearly illustrated. The side wall of the chamber 14 is formed with four axially extending rows of inwardly extending projections 24. Each projection 24 forms a dimple 26 on the exterior of the chamber 14. As previously noted, the condenser assembly 10 is preferably made of glass, and the projections 24 are formed with a punch when the glass is blown. Each projection 24 has an inner end 28 which is relatively closely aligned with the axis of the condensate drain 18. The projections 24 give the internal surface of the chamber 14 increased surface area for contacting the cooled gas, and the associated dimples 26 give the external surface of the chamber 14 increased surface area for contacting the ambient atmosphere. As the cooled gas passes up through the chamber 14, the increased area contact with the chamber walls causes the water content in the gas to condense out of the gas and onto the internal surface of the chamber 14. The condensate coalesces and runs down the internal surface of the projections 24, thus causing drops to form at the inner ends 28 of the projections 24. Positioning the inner ends 28 of the projections 24 close to the axis of the drain 18 causes the drops to fall to the bottom of the chamber 14 very close to the drain 18 and results in quick passage of the condensate from the chamber 14 down into the drain 18. The condenser chamber 14 and its projections 24 are similar to structure shown in U.S. Patent No. 2,197,243 to J. J. Moran.

Referring back to FIG. 1, it will be noted that the condensate entering the drain 18 will flow down into the trap 20 adding to the water in the trap 20. On the downstream side of the trap 20, there is positioned a closed end pipe 21 below which the assembly outlet 22 is positioned. The end 21 of the pipe is closed because the gas coming in the inlet end 12 of the assembly 10 is under pressure. When a non-pressurized source of gas is used, the end 21 of the pipe can be vented to the atmosphere. The outlet 22 is telescoped into a conduit 30 which leads to a condensate reservoir 32. The reservoir 32 has an outlet 34 provided with a valve 36 which is periodically activated to release condensate from the reservoir 32. The condensate in the trap 20 will build up to a level even with the mouth of the outlet 22 whereafter additional condensate added to the inlet side of the trap 20 from the chamber 14 will cause a like amount of condensate to spill over into the outlet 22 and, thence, to the reservoir 32. Once the system is installed in any particular facility, it is a relatively simple matter to observe the system in operation and determine how long it takes to substantially fill the reservoir 32. With this information, the timing of the drain valve 36 can be set whereafter the system will operate in a relatively trouble free manner. Draining of the reservoir 32 is vented through to the stack gas conduit 2. The passage 38, it will be appreciated, is telescoped onto the dry gas outlet 16 and conducts dry gas to whatever instrumentation is testing the gas downstream.

It will be readily appreciated that the system of this invention is simple and inexpensive to produce and can be made in one piece out of glass. It does not include any relative membranes that can clog up, break down, or the like, and does not need to be flushed or cleaned. The system can operate on a steady stream gas flow, or on a periodic stream gas flow with no problems. It is relatively inert and will not taint instrument readings of the dry gas that passes through it.

Since many changes and variations of the disclosed embodiment of the invention may be made without departing from the inventive concept, it is not intended to limit the invention otherwise than as required by the appended claims.

What is claimed is:

1. A system for removing moisture from a gas, said system comprising:
    (a) an inlet conduit or conducting moisture-bearing gas into said system, said inlet conduit opening into a vertically disposed drain conduit;
    (b) a moisture condensing chamber disposed vertically above said drain conduit and said inlet conduit, said drain conduit opening into said moisture condensing chamber and being vertically aligned therewith so that gas entering said drain conduit through said inlet conduit will rise through said drain conduit into said condensing chamber, said condensing chamber including a plurality of inwardly extending projections which increase the internal surface area of said condensing chamber and on which drops of moisture will condense from the gas rising through said condensing chamber, said projections having downwardly directed ends operable drip moisture therefrom toward said drain conduit whereby the condensed moisture will flow into said drain conduit;
    (c) a U-shaped trap disposed vertically below said drain conduit and communicating with said drain conduit, said trap being operable to receive condensate flowing into said drain conduit, and said trap, when filled with liquid, being operable to prevent incoming gas from moving through said drain conduit and said trap, whereby gas entering said drain conduit via said inlet conduit can only pass through said condensing chamber;
    (d) an outlet conduit opening into a leg of said trap opposite said drain conduit, said outlet conduit being disposed at a level on said leg which is vertically below the level of said inlet conduit, said outlet conduit being operable to discharge liquid from said trap upon influx of condensate to said trap from said condensing chamber; and
    (e) a dry gas outlet disposed vertically above and opening into said condensing chamber.

2. The system of claim 1 further comprising cooling means upstream of said inlet conduit for cooling incoming gas to a temperature in the range of about 40° to 45° F.

3. The system of claim 1 wherein said inlet conduit, said condensing chamber, said drain conduit, said trap, said condensate outlet conduit, and said dry gas outlet conduit are integral parts of a unitary glass apparatus.

4. The system of claim 3 wherein said unitary glass apparatus includes an upwardly extending pipe communicating with said trap adjacent to said condensate outlet, said pipe having a sealed distal end to allow said apparatus to receive pressurized gas for treatment.

* * * * *